United States Patent
Karnopp et al.

(10) Patent No.: US 8,526,822 B2
(45) Date of Patent: Sep. 3, 2013

(54) OPTICAL TRANSCEIVER ASSEMBLY WITH INTEGRATED AMPLIFIER AND TRANSMITTER DRIVER ON A FLEXIBLE CIRCUIT

(75) Inventors: Roger J. Karnopp, Eagan, MN (US); Kevin J. Thorson, Eagan, MN (US); Gregory M. Drexler, Minnetonka, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 388 days.

(21) Appl. No.: 12/554,293

(22) Filed: Sep. 4, 2009

(65) Prior Publication Data
US 2011/0058818 A1   Mar. 10, 2011

(51) Int. Cl.
*H04B 10/00* (2013.01)
*G02B 6/12* (2006.01)

(52) U.S. Cl.
USPC ............................................ 398/135; 385/14

(58) Field of Classification Search
USPC ........................................ 385/14; 398/135
See application file for complete search history.

(56) References Cited

U.S. PATENT DOCUMENTS

| | | | |
|---|---|---|---|
| 6,892,449 B1 | 5/2005 | Brophy et al. | |
| 7,217,043 B2 | 5/2007 | Schunk | |
| 7,284,916 B2 * | 10/2007 | Sasser et al. | 385/92 |
| 2003/0053766 A1 | 3/2003 | Cheng et al. | |
| 2003/0201462 A1 | 10/2003 | Pommer et al. | |

OTHER PUBLICATIONS

U.S. Appl. No. 12/549,893, filed Aug. 28, 2009.
U.S. Appl. No. 12/614,663, filed Nov. 9, 2009.

* cited by examiner

*Primary Examiner* — Kevin S Wood
(74) *Attorney, Agent, or Firm* — Hamre, Schumann, Mueller & Larson, P.C.

(57) ABSTRACT

A flexible circuit assembly is described that integrates a first fiber optic die, for example a transmitter die, a second fiber optic die, for example a receiver die, a trans-impedance amplifier die and a transmitter driver die on a single flexible circuit. Alignment holes and multiple die are accurately placed on a single flexible circuit. The precise placement of alignment holes and fiber optic die facilitate micron alignment accuracy to a fiber optic connector, preferably a mechanical transfer (MT) connector. A heat sink is provided that transfers heat from the trans-impedance amplifier die and the transmitter driver die and isolates the fiber optic die from the heat source. Circuitry for the first fiber optic die, second fiber optic die, impedance die, and driver die, including isolated grounding circuitry, is also integrated on the flexible circuit assembly.

24 Claims, 3 Drawing Sheets

OPTICAL TRANSCEIVER ASSEMBLY WITH INTEGRATED AMPLIFIER AND TRANSMITTER DRIVER ON A FLEXIBLE CIRCUIT

FIELD

This disclosure relates to an optical assembly containing at least one optical transmitter die, at least one optical receiver die, at least one trans-impedance amplifier, and at least one transmitter driver integrated on a single flexible circuit and the integration of a heat dispersion method.

BACKGROUND

Known optical transceivers components are comprised of a fiber optic transmitter die, a fiber optic receiver die, a trans-impedance amplifier die, and a transmitter driver die. Each of the fiber optic transmitter and fiber optic receiver die are mounted on separate flexible circuit assemblies. The trans-impedance amplifier die and the transmitter driver die are mounted together on a separate assembly and are maintained in a fixed location, usually on the circuit board. The trans-impedance amplifier die and the transmitter driver die are high power devices and generate a large amount of heat. It has been found that placing these components in close proximity to the fiber optic transmitter die and the fiber optic receiver die results in degraded performance of the die.

SUMMARY

A flexible circuit assembly is described that integrates a first fiber optic die, a second fiber optic die, a trans-impedance amplifier die and a transmitter driver die on a single flexible circuit. A heat sink is provided that transfers heat from the trans-impedance amplifier die and the transmitter driver die and isolates the fiber optic die from the heat sources.

The flexible circuit assembly is used in an optical transceiver component as shown in FIG. 1. Integration of the first fiber optic die, second fiber optic die, trans-impedance amplifier die and transmitter driver die into a single flexible circuit assembly allows for the miniaturization of optical assemblies used in an optical transceiver component. The reduction in size of the optical assemblies within a transceiver component will improve manufacturability and cost. In addition, transceiver reliability and maintainability will improve. There will also be data rate frequency performance improvements due to the improved proximity and interconnection of the first fiber optic die to the transmitter driver and the second fiber optic die to the trans-impedance amplifier.

The integration of a heat sink allows for the close proximity of the driver and amplifier to the fiber optic die. The heat sink is thermally connected to the driver and amplifier as part of the flexible circuit assembly and the heat sink is in contact with the optical transceiver frame in order to further dissipate the heat away from the fiber optic die.

In one example, a fiber optic transmitter die, a fiber optic receiver die, a trans-impedance amplifier die and a transmitter driver die are integrated into one flexible circuit assembly and are disposed on a first major surface of the flexible circuit. A heat sink is integrated with the flexible circuit assembly. An electrical connection is provided between the fiber optic transmitter die and the transmitter driver and between the fiber optic receiver die and the trans-impedance amplifier. Circuitry is also provided from the trans-impedance amplifier die and the transmitter driver die to the second end of the flexible circuit. The circuitry is connected to the flexible circuit.

In addition, the fiber optic die each contain grounding circuitry and the grounding circuitry of the fiber optic die is isolated from the each other. The trans-impedance amplifier die and the transmitter driver die also each contain grounding circuitry and the grounding circuitry of the trans-impedance amplifier die is isolated from the grounding circuitry of the transmitter driver die.

DRAWINGS

DETAILED DESCRIPTION

A flexible circuit assembly is described that integrates a first fiber optic die, a second fiber optic die, a trans-impedance amplifier die and a transmitter driver die on a single flexible circuit. Alignment holes and the multiple die are accurately placed on a single flexible circuit. The precise placement of the alignment holes and the fiber optic die facilitate micron alignment accuracy to a fiber optic connector, preferably a mechanical transfer (MT) connector. A heat sink is provided that transfers heat from the trans-impedance amplifier die and the transmitter driver die. The heat sink is thermally isolated from the fiber optic die. Low thermal conduction material thermally insulates the first and second fiber optic die from the trans-impedance amplifier die and the transmitter driver die. Voltage circuitry for the first fiber optic die, second fiber optic die, trans-impedance die, and transmitter driver die, including isolated grounding circuitry, is also integrated on the flexible circuit assembly.

Figure 2:
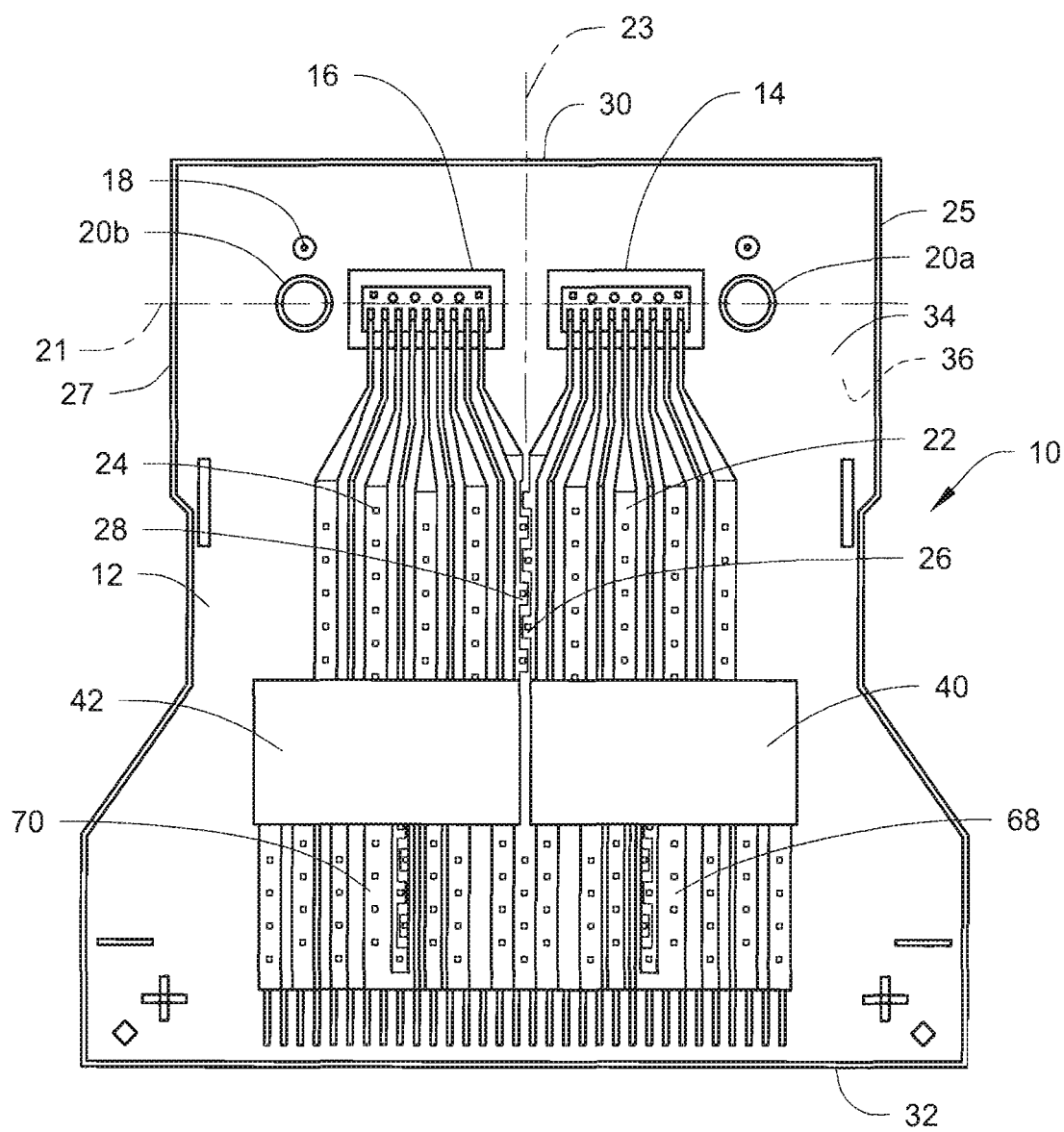
FIG. 2 illustrates a flexible circuit assembly integrating a fiber optic receiver die, a fiber optic transmitter die, a trans-impedance amplifier die and a transmitter driver die on a single flexible circuit.
Figure 3:
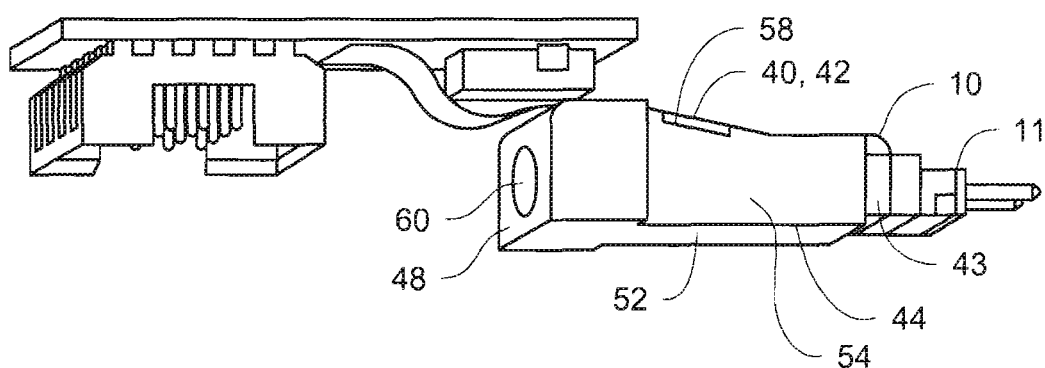
FIG. 3 illustrates the flexible circuit assembly of FIG. 2 attached to a board and to the thermal heat sink.

Referring to FIG. 2, one example of a flexible circuit assembly 10 contains a flexible circuit 12, at least one first fiber optic die 14, at least one second fiber optic die 16, at least one transmitter driver die 40, at least one trans-impedance amplifier die 42, and the circuitry to electrically connect the die. Referring to FIG. 3, a thermal heat sink 44 is integrated with the flexible circuit assembly 10. As described further herein, the first die 14 will be described as a transmitter die that performs an optical transmission function, and the second die 16 will be described as a receiver die that performs an optical receive function. It is to be realized however, that the die 14, 16 are not limited to being transmitter and receiver die.

Figure 1:
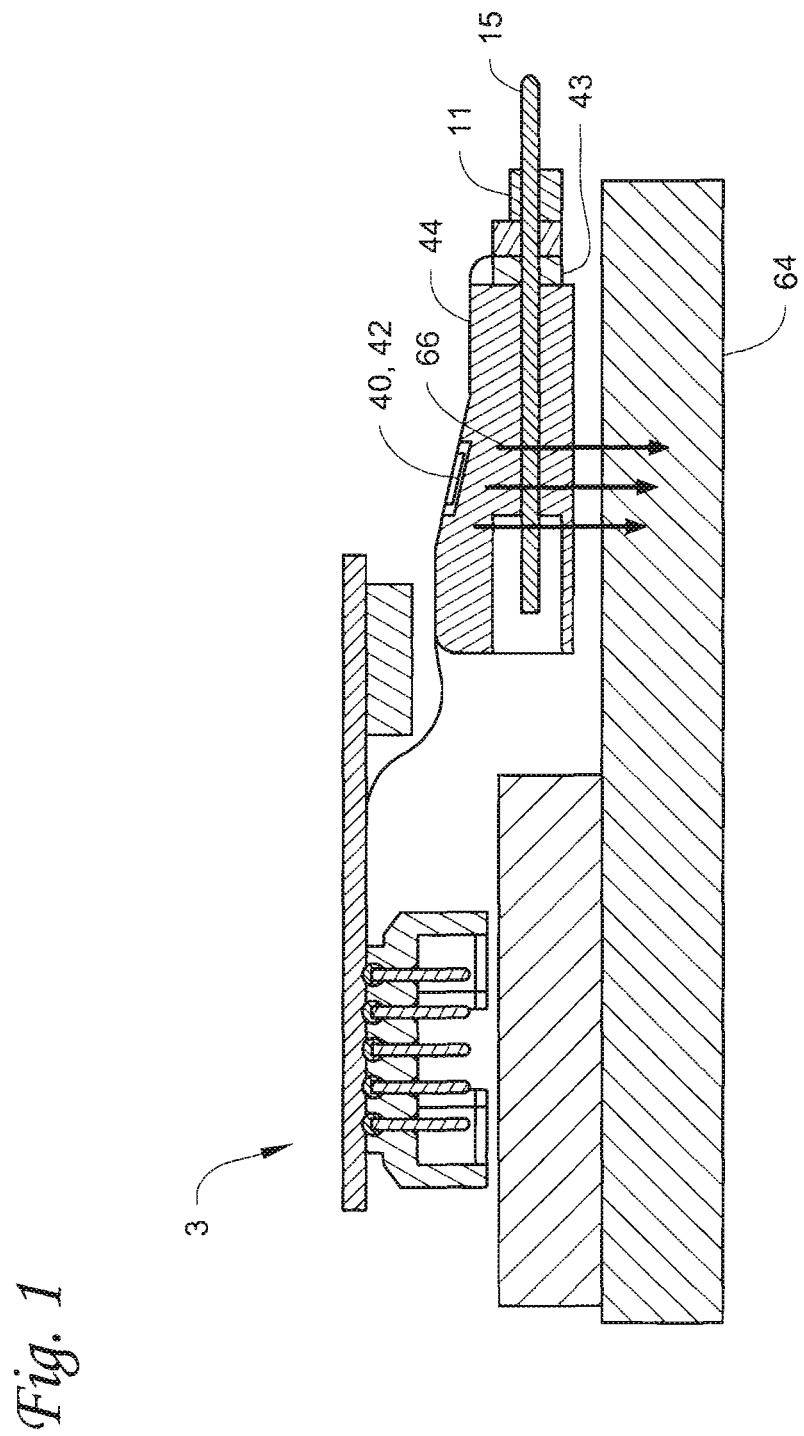
FIG. 1 illustrates a cross-sectional view of an optical transceiver component incorporating a thermal heat sink and the heat sink path from the amplifier and driver die through the internal thermal heat sink and into the optical transceiver component package body or housing.

As shown in FIG. 2, the flexible circuit 12 has a flat ribbon-like shape with a first end 30, a second end 32 opposite the first end 30, a first side 25 opposite a second side 27, a first major surface 34 and a second major surface 36. The flexible circuit 12 can be any size or shape that allows for the integration of the flexible circuit 12 in an optical transceiver component 3, as illustrated in the embodiment of FIG. 1.

The flexible circuit 12 could be made of, for example, a polyimide insulating material and copper conductor material.

In one example, the flexible circuit 12 is attached to a connector 11, for example, an MT connector. In the illustrated example, the region of the flexible circuit 12 adjacent the first end 30 at least in the areas of the die 14, 16 is made light translucent. For example, the material of the flexible circuit 12 adjacent the die 14, 16 can be a light translucent material that is transparent to the wavelength of optical light thereby allowing the connector 11 to transmit optical signals through the flexible circuit 12 to the transmitter die 14 and the receiver die 16 and to allow the die 14, 16 to transmit optical signals through the flexible circuit 12 to the fiber optic connector 11. It is to be realized that the fiber optic connector 11 can be any type of fiber optic connector 11 including, but not limited to, MT, SC, ST, FC, FDDI, etc.

The alignment holes 20a, 20b extend through any portion of the flexible circuit 12 from the first major surface 34 to the second major surface 36. In the embodiment shown in FIG. 2, the alignment holes 20a, 20b are located adjacent the first end 30 of the flexible circuit 12. Centers of the alignment holes 20a, 20b are aligned along a first axis 21 that is, in the illustrated example, generally parallel to the first end 30. The flexible circuit 12 also has a second axis 23 that is perpendicular to the first axis 21, and the alignment holes 20a, 20b are equidistant from the second axis 23 on either side thereof. In use of the flexible circuit 12, as shown in the embodiment of FIG. 1, alignment pins 15 of an off-the-shelf ferrule MT connector 11 extend through the alignment holes 20a, 20b.

A transmitter driver die 40 and a trans-impedance amplifier die 42 are disposed on the flexible circuit 12. In the illustrated example shown in FIG. 2, the transmitter driver die 40 and the trans-impedance amplifier die 42 are disposed on the first major surface 34 of the flexible circuit 12 between the alignment holes 20a, 20b and the second end 32. The transmitter driver die 40 and the trans-impedance amplifier die 42 could be attached to the flexible circuit 12 with, for example, adhesives, epoxy, or by thermal compression bonding.

Figure 4:
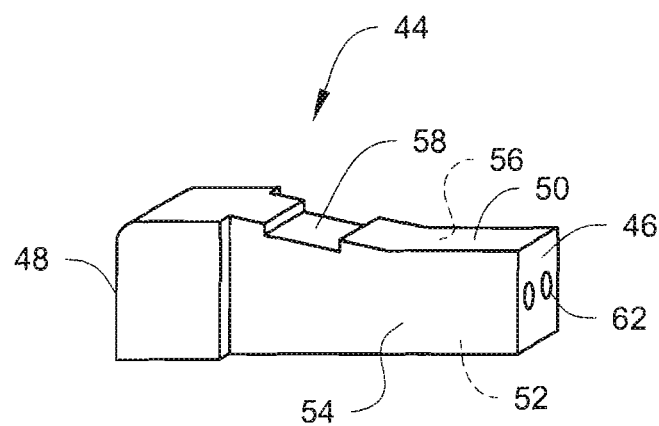
FIG. 4 illustrates an example of a thermal heat sink for integration with a flexible circuit assembly.

With reference to FIG. 3, a thermal heat sink 44 is integrated with the flexible circuit assembly 10. The thermal heat sink 44 is in contact with the transmitter driver die 40 and the trans-impedance amplifier die 42. As shown in FIGS. 3 and 4, the thermal heat sink 44 is comprised of a first end 46, a second end 48 opposite the first end 46, a first major surface 50, a second major surface 52 opposite the first major surface 50, a first side 54 and a second side 56 opposite the first side 54. The first major surface 50 contains a recess 58. The transmitter driver die 40 and the trans-impedance amplifier die 42 are disposed in the recess 58. The transmitter driver die 40 and the trans-impedance amplifier die 42 can be bonded to the thermal heat sink 44 with a conductive adhesive.

The thermal heat sink 44 can be made of any material that provides for high thermal conductivity, for example, aluminum silicon carbide or aluminum silicon nitride. The thermal heat sink 44 is provided with a spring holder 60 at the second end 48. The spring holder 60 holds a spring. Spring pressure provides force on the thermal heat sink 44 to optical transceiver component housing interface 64 which reduces the thermal contact resistance at this interface 64. The spring holder 60 could be angled downward, thereby providing downward force allowing the thermal heat sink 44 to be held down to the housing interface to maintain physical contact between the heat sink and the interface 64.

The thermal heat sink 44 has alignment holes 62 on the first end 46. The alignment holes 62 are made to align with the alignment pins 15 (FIG. 1) of off-the-shelf fiber optic connectors 11. The thermal heat sink 44 is in contact with the alignment pins 15 and is able to slide within the package housing 3. The thermal heat sink 44 also allows for the accommodation of spring reaction force supplied to the fiber optic connector 11.

The thermal heat sink 44 is in contact with and pulls heat away from the transmitter driver die 40 and the trans-impedance amplifier die 42. Therefore, as illustrated in FIG. 1, the thermal heat sink path 66 is from the transmitter driver die 40 and the trans-impedance amplifier die 42 through the internal thermal heat sink 44 and into the optical transceiver assembly 64. The heat from the transmitter driver die 40 and the trans-impedance amplifier die 42 is thermally isolated from the fiber optic die 14, 16 with thermal conduction material 43. The fiber optic die 14, 16 are temperature sensitive and degradation of performance occurs as the temperature rises. By dissipating the heat directly to the next higher assembly 64, the transmitter driver die 40 and the trans-impedance amplifier die 42 can be placed in closer proximity to the fiber optic die 14, 16 which improves the data rate frequency performance of the optical transceiver component. Therefore, the closer in proximity that the transmitter driver die 40 and the trans-impedance amplifier die 42 can be to the fiber optic die 14, 16, the better the performance of the optical transceiver component.

In other embodiments, heat can be dispersed by integrating other active cooling approaches such as thermal electric coolers, air, fluid, etc.

As shown in FIG. 2, the flexible circuit assembly 10 further comprises fiducials 18 on the flexible circuit 12 adjacent the first end 30, and a first fiber optic die 14 and a second fiber optic die 16 on the flexible circuit 12 adjacent the first end 30. Function and placement of these components are described in U.S. patent application Ser. No. Ser. 12/549,893, filed on Aug. 28, 2009, entitled "Integrated Optical Receiver and Optical Transmitter on a Single Flexible Circuit Assembly" which is incorporated herein by reference. As described in that application, and illustrated herein in FIG. 2, local fiducials 18 are used to facilitate the accurate placement of alignment holes 20a, 20b and fiber optic die 14, 16, with micron accuracy, to align the fiber optic die 14, 16 with each other and the fiber optic connector 11.

As shown in FIG. 2, the flexible circuit assembly 10 contains transmitter circuitry 22, receiver circuitry 24, and grounding circuitry 26, 28 and the transmitter grounding circuitry 26 is isolated from the receiver grounding circuitry 28.

The flexible circuit assembly 10 further comprises transmitter driver die circuitry 68 and trans-impedance amplifier die circuitry 70 on a surface of and connected to the flexible circuit 12 and electrically connected to the transmitter driver die 40 and the trans-impedance amplifier die 42, respectively. As illustrated in FIG. 2, the transmitter driver die circuitry 68 and trans-impedance amplifier die circuitry 70 are on the first major surface 34 of the flexible circuit 12.

The examples and embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A flexible circuit assembly comprising:
   a flexible circuit comprising an insulating base material and a conductor material, wherein the flexible circuit includes first and second opposite ends;
   a first alignment hole and a second alignment hole closer to the first end than they are to the second end;

a fiber optic transmitter and a fiber optic receiver on the flexible circuit closer to the first end than they are to the second end; and a driver die and an amplifier die connected to the flexible circuit, the driver die and the amplifier die are disposed between the alignment holes and the second end, and the fiber optic transmitter and the fiber optic receiver are separate from the driver die and the amplifier die, the fiber optic transmitter and the fiber optic receiver are disposed between the driver and amplifier dies and the first end, and the driver and amplifier dies are disposed between the fiber optic transmitter and the fiber optic receiver and the second end.

2. The flexible circuit assembly of claim 1, further comprising fiducials on the flexible circuit adjacent the first end.

3. The flexible circuit assembly of claim 1, further comprising driver die circuitry and amplifier die circuitry connected to the flexible circuit and electrically connected to the driver die and the amplifier die, respectively.

4. The flexible circuit assembly of claim 1, further comprising a thermal insulator configured to thermally isolate the driver die and the amplifier die from the fiber optic transmitter and the fiber optic receiver.

5. The flexible circuit assembly of claim 1, wherein centers of the first alignment hole and the second alignment hole are aligned along an axis, and the axis extends through the fiber optic transmitter and the fiber optic receiver.

6. The flexible circuit assembly of claim 1, wherein the fiber optic transmitter and the fiber optic receiver are disposed between the first alignment hole and the second alignment hole.

7. The flexible circuit assembly of claim 1, wherein the driver die and the amplifier die are disposed closer to the second end than they are to the first end.

8. The flexible circuit assembly of claim 1, wherein the flexible circuit is bendable along an axis generally parallel to the first end of the flexible circuit so that a first portion of the flexible circuit with the fiber optic transmitter and the fiber optic receiver and a second portion of the flexible circuit with the driver and amplifier dies can face different directions.

9. An assembly, comprising:
a flexible circuit assembly including:
a flexible circuit comprising an insulating base material and a conductor material, wherein the flexible circuit includes first and second opposite ends;
a first alignment hole and a second alignment hole closer to the first end than they are to the second end;
a fiber optic transmitter and a fiber optic receiver on the flexible circuit closer to the first end than they are to the second end; and
a driver die and an amplifier die connected to the flexible circuit, the driver die and the amplifier die are disposed between the alignment holes and the second end, and
the fiber optic transmitter and the fiber optic receiver are separate from the driver die and the amplifier die, the fiber optic transmitter and the fiber optic receiver are disposed between the driver and amplifier dies and the first end, and the driver and amplifier dies are disposed between the fiber optic transmitter and the fiber optic receiver and the second end; and
a thermal heat sink connected with the driver die and the amplifier die.

10. The assembly of claim 9, wherein
the thermal heat sink comprises a first end and a second end opposite to the first end, a first major surface adjacent and generally perpendicular to the first and second ends, and a second major surface opposite to the first major surface; the first major surface includes a recess, and the driver die and amplifier die are disposed in the recess.

11. The assembly of claim 10, further comprising a conductive material disposed in the recess and engaged with the driver die and the amplifier die.

12. The assembly of claim 9, wherein the thermal heat sink is made of aluminum silicon carbide or aluminum silicon nitride.

13. The assembly of claim 10, wherein the thermal heat sink comprises a spring holder that holds a spring.

14. The assembly of claim 10, wherein the thermal heat sink comprises alignment holes at the first end, the alignment holes being generally parallel to the first major surface thereof and configured to receive alignment pins.

15. The assembly of claim 9, further comprising fiducials on the flexible circuit adjacent the first end.

16. The assembly of claim 9, further comprising driver die circuitry and amplifier die circuitry connected to the flexible circuit and electrically connected to the driver die and the amplifier die, respectively.

17. The assembly of claim 13, wherein the spring holder is angled downward.

18. The assembly of claim 9, wherein the driver die and the amplifier die each have a first major surface attached to the flexible circuit, and a second major surface opposite to the first major surface and attached to the heat sink.

19. The assembly of claim 9, further comprising a thermal insulator configured to thermally isolate the driver die and the amplifier die from the fiber optic transmitter and the fiber optic receiver.

20. The assembly of claim 10, wherein the flexible circuit is bendable along an axis generally parallel to the first end of the flexible circuit so that a first portion of the flexible circuit with the fiber optic transmitter and the fiber optic receiver is disposed generally parallel to the first end of the thermal heat sink and a second portion of the flexible circuit with the driver and amplifier dies is disposed generally parallel to the first major surface of the thermal heat sink, the driver die and amplifier die are disposed in the recess on the first major surface, and the fiber optic transmitter and the fiber optic receiver abut against a thermal insulator which is sandwiched between the first portion of the flexible circuit and the first end of the thermal heat sink and configured to thermally isolate the driver die and the amplifier die from the fiber optic transmitter and the fiber optic receiver.

21. The assembly of claim 9, wherein the fiber optic transmitter and the fiber optic receiver are disposed between the first alignment hole and the second alignment hole.

22. The assembly of claim 9, wherein the driver die and the amplifier die are disposed closer to the second end than they are to the first end.

23. The assembly of claim 9, wherein the flexible circuit is bendable along an axis generally parallel to the first end of the flexible circuit so that a first portion of the flexible circuit with the fiber optic transmitter and the fiber optic receiver and a second portion of the flexible circuit with the driver and amplifier dies can face different directions.

24. An assembly, comprising:
a flexible circuit assembly including:
a flexible circuit, wherein the flexible circuit includes first and second opposite ends;
a first alignment hole and a second alignment hole adjacent the first end; and a driver die and an amplifier die connected to the flexible circuit, and the driver die and the amplifier die are disposed between the alignment holes and the second end; and a thermal heat sink connected with the driver die and the amplifier die, wherein the thermal heat sink includes first and second ends, a first major surface, and a second major surface; the first major surface includes a recess, and the driver die and amplifier die are disposed in the recess, and the thermal heat sink includes a spring holder at the second end, and the spring holder holds a spring.

\* \* \* \* \*